INVENTOR.
ALBERT PERLMUTTER
BY
Spencer E. Olson
ATTORNEY

INVENTOR.
ALBERT PERLMUTTER
BY
Spencer E. Olson
ATTORNEY 3,123,743

FLUID COOLED ELECTRONIC CHASSIS

Albert Perlmutter, Sharon, Mass., assignor to Sylvania Electric Products Inc., a corporation of Delaware Filed Apr. 14, 1960, Ser. No. 22,287
8 Claims. (Cl. 317—100)

This invention relates to cooling of electronic equipment and more particularly to fluid cooled electronic chasses.

Most of the electric power used to operate present-day electronic equipment is converted into unwanted heat; only a small part of the power is converted into useful energy. This results in an undesirable temperature rise in the equipment, the magnitude of which depends upon the amount of heat dissipated by the equipment to its environment. In some electronic equipment, for example television receivers, little special design effort is necessary to provide the requisite transfer of heat since there is normally sufficient space around the tubes and other components of the chassis that adequate cooling is provided by natural convection of air over the assembly. In certain specialized electronic equipment, however, where space and weight are of prime importance, miniaturization is employed, resulting in much greater heat density and the attendant requirement of transferring the heat from the chassis. Some means must, of course, be devised for lowering or maintaining operating temperatures within satisfactory limits. In general, it is not sufficient to force cooling air around the components because space is limited, and the amount of cooling air that can be introduced is insufficient. A further requirement of specialized equipment, particularly for airborne application, is that it be composed as far as possible of modular units, that is, units that can be easily plugged in or out for replacement or servicing as the case may be. These modular units must be small and compact, and this usually results in a further reduction in the amount of space available for the flow of cooling air about the components mounted therein.

Heretofore two general techniques have been employed for cooling of the components of electronic chasses: a so-called direct air method as exemplified by Pat. No. 2,933,655 entitled "Electronic Equipment Packaging" and assigned to the assignor of the present application, and the indirect or "cold-plate" method, a form of which is shown in Pat. No. 2,912,624. The direct air method employs a combination of techniques including isolation of the hotter components from the lower temperature components both by distance and thermal insulation, insulation of the high heat density components, the low heat density components, or both, from the surrounding ambient, and passing the cooling air directly in contact with the hotter components, the passages for air flow being designed to provide a sufficiently high heat transfer coefficient that the exit air temperature is not materially above that to which the hotter components must be cooled. In a chassis which includes a plurality of tubes, as is usually the case, the cooling air is introduced to the tubes in parallel, the volume of air flowing over each of the tubes being adjusted, for any predetermined exhaust pressure, in accordance with the heat dissipation of the individual tubes to provide an optimum compromise between the maintenance of all areas of the tube at a temperature where reliable operation results and an exit air temperature as high as possible. The distribution of cooling air by metering orifices contributes to the overall efficiency of the cooling system, inasmuch as only that coolant to maintain the tube at a reliable operating temperature is applied to each tube, thereby reducing the overall expenditure of cooling air. While this technique makes very efficient use of available cooling air, making it particularly useful in certain airborne applications where conservation of air-conditioning equipment is imperative, it has some disadvantages. The orifices used for air distribution are generally quite small, and to get the requisite accuracy of distribution the orifices must be constructed with close tolerances and hence are quite expensive. Further, since reliable operating temperatures for electron tubes are considerably higher than for other components associated with the tubes, they are separated from the remainder of the circuitry. This requirement reduces the packaging density of the electrical components below what may otherwise be desired in certain applications. Finally, the thermal insulation required to isolate the tubes from the lower temperature components increases the volume and weight, and the cost, of the package.

In the "cold-plate" method, a rather thick chassis, of the order of one-quarter inch thick, is provided on which the components are mounted. The chassis has holes drilled through the length of the chassis through which cooling air is forced. The electrical components and component holders, such as tube shields, are mounted on the chassis, normally on one surface thereof, the components being cooled by conduction of heat from the components to the plate and thence by exchange of heat with the air flowing through the passages. With this cooling method, the coolant does not come in direct contact with any of the electronic components, neither the tubes nor the resistors and capacitors. In other words, this method does not provide for passage of colder air over low temperature components such as resistors and capacitors before entering the area reserved for the tubes, as in the direct air method described above. As a consequence, a greater volume of air, or flow at a higher velocity, is required to maintain safe operating component temperatures. Further, in the cold-plate method of cooling, the clamps for the tubes are normally soldered to the cold-plate while the leads from the tube are secured to a circuit board, separated from the cold-plate, on which the other circuit components are mounted. This arrangement makes servicing of the equipment extremely difficult because the tube clamps must be unfastened very carefully in order not to damage the leads and the circuit board. Finally, since the cooling air does not pass directly over any of the electronic parts, the components selected for a given available air flow must be able to withstand a higher operating temperature than if direct cooling were used; normally, components designed to withstand higher operating temperatures are more expensive.

With the foregoing appreciation of the shortcomings of available cooling techniques for electronic chasses, applicant has as a general object of the present invention to provide a cooling system for electronic equipment which will make more efficient use of available cooling fluid.

Another object of the invention is to provide a fluid cooled electronic chassis having high component density and high efficiency of utilization of coolant.

Still another object of the invention is to provide a fluid cooled electronic chassis that is relatively simple to manufacture and easy to disassemble and maintain.

Still another object of the invention is to provide an electronic chassis having improved tube retainers for enhancing the transfer of heat from the tube to the coolant while providing ease of assembly and disassembly of the chassis.

These and other objects which will be apparent as the description proceeds, are achieved by the present invention by a combination of the better features of the direct air cooling method and the cold-plate method described above. A feature of the invention is a chamber in which the circuit components, including tubes, are positioned one side of the chamber being enclosed by a fluid-cooled chassis to which one part of a split tube-retainer is secured. Cooling air first enters the chamber, preferably from the bottom, and passes first over the low temperature components, such as resistors and capacitors, then in direct contact with the tube retainers to pick up a portion of the heat dissipated thereby, and then enters openings in an upper edge of the chassis where it changes direction of flow and passes down through passageways inside the chassis and then discharged. Heat dissipated by the tubes is transferred to the chassis by thermal conduction and thence to the coolant flowing through the chassis.

These and other features of the invention will become more apparent from the following description taken in conjunction with the accompanying drawings, in which.

Figure 1:
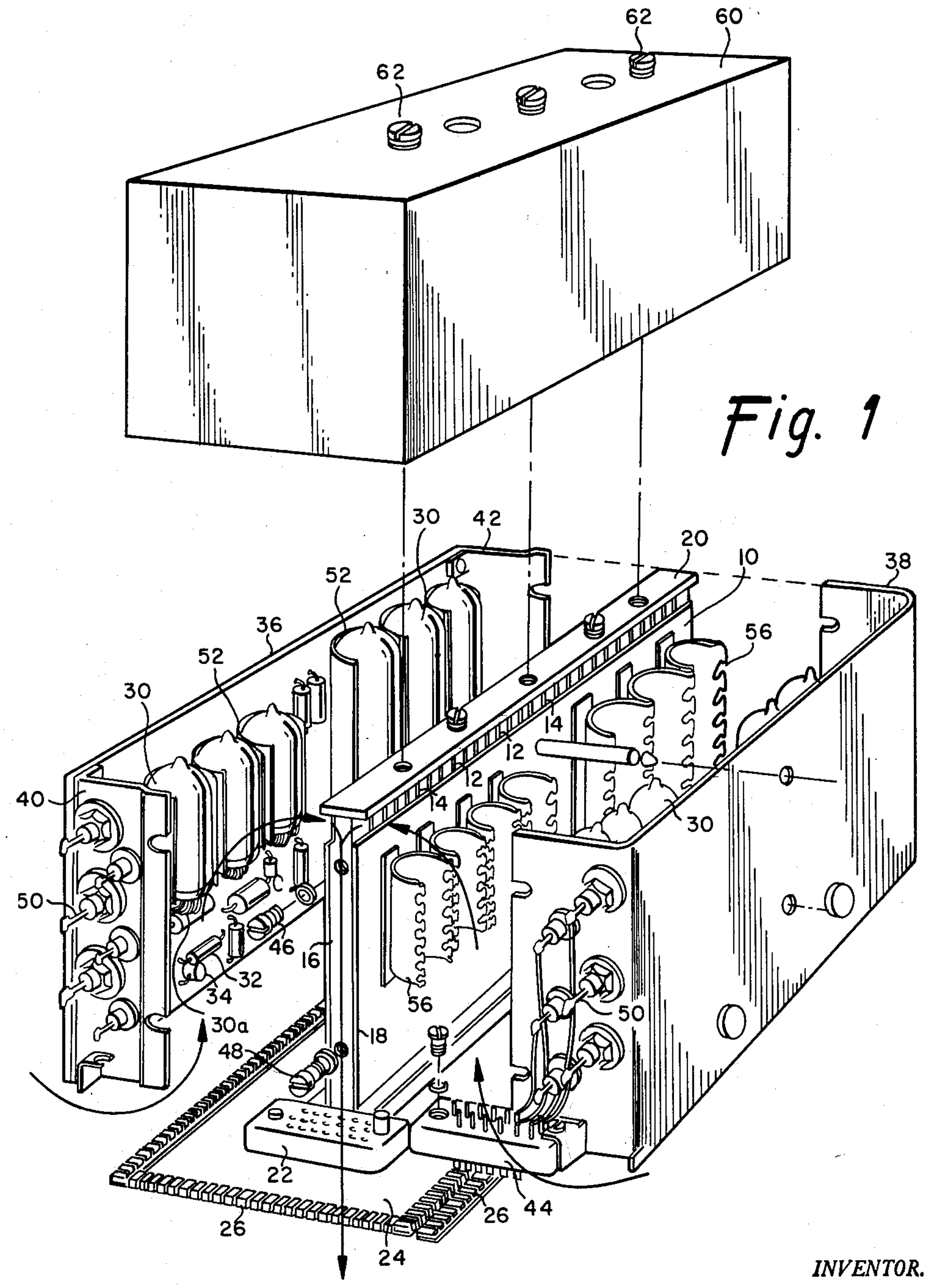
FIG. 1 is an exploded isometric view of an electronic chassis embodying the invention.

Referring now to FIG. 1, the principal mechanical support for the package is a central plate 10 of length and height corresponding to respective dimensions of the assembled chassis. The plate 10 is formed of heat conducting material, preferably metal, and is provided with fluid conducting passages 12 extending parallel to the height dimension, with an entrance for cooling fluid along the upper edge and discharge openings along the lower edge of the plate. The passageways 12 can be provided in a number of ways, the drawing illustrating one technique that has been found convenient. The core of the cold-plate is formed of a large number of spaced fins 14 coextensive with the height of the plate 10 with plates 16 and 18 secured to opposite sides thereof to provide internal ducts. The plates 16 and 18 are narrower than the length of the strips 14 to provide an opening along the upper edge, and the upper ends of the ducts are closed by a plate 20. In keeping with the modular design concept, a female connector 22 into which the circuit elements of a chassis are connected, and from which connection to other circuitry may be made, is secured to the cold-plate. In the disclosed arrangement, where electronic components are mounted on either side of the cold-plate, openings for air are provided on both sides of the plate; however, should a "single-sided" chassis be desired, the plate would, of course, be completely closed on one side. The chassis is closed at the bottom by metal plate 24 secured to the lower edge of plate 10. The periphery of the plate is provided with flexible fingers 26 which mate with the lower edges of the balance of the chassis (to be described) to provide a noise suppression shield. The fingers, also, since they occupy only about 40% of the peripheral dimension of the chassis, provide a large number of openings for entry of cooling air all around the package.

The circuit components of the electronic package such as electron tubes 30, resistors 32, and capacitors 34, are supported on a circuit board 36, which may be an etched copper insulated printed circuit board. Alternatively, when all of the tubes in the chassis are required in the circuit contained in the chassis for point-to-point layout, the tubes may be supported on a metal plate 38. The plate 38 has turned-in ends as shown, and the circuit board 36 has L-shaped end pieces 40 and 42 secured to the ends thereof to provide end closures for the package. When assembled, a male connector terminal 44 secured to circuit plate 38 engages female connector 22, end plates 40 and 42 project over the turned-in ends of plate 38, and both sides of the chassis are secured to cold-plate 10, as by screws 46 and 48. Should the particular circuit contained in the package, or its application require them, standoff connectors 50 may be supported on the end closures.

Considering the circuit board more specifically, the resistors and capacitors are preferably mounted on the lower edge of the available circuit board area, and the electron tubes 30, which normally would be of the miniature or sub-miniature type, are supported in a vertical position by tube clamps 52 which are riveted or otherwise secured to the board 36 (or plate 38). The tube clamp (to which more detailed reference will be made later) is in the form of half a circular cylinder of a diameter such as to firmly engage the tube. Sockets are not provided for the tubes, the leads 30*a* being directly connected to appropriate points on the circuit board 36. It should be noted that with this construction all of the circuit elements, including the tubes, are mounted on the same circuit board, the board, in turn, being separately secured to the cold-plate 10 to permit its removal for servicing and maintenance without the detachment of any connections.

Figure 3:
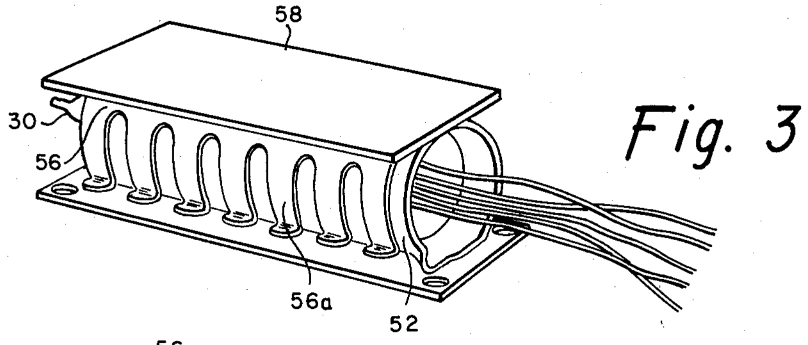
FIG. 3 is an isometric view of the split tube retainer employed in the chassis.
Figure 4:
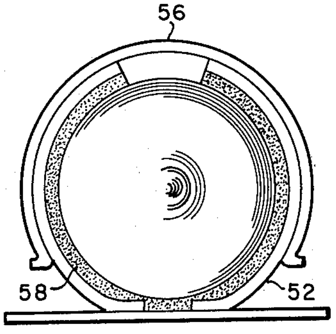
FIG. 4 is an end view of the tube retainer of FIG. 3.
Figure 5:
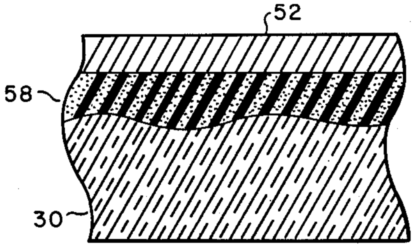
FIG. 5 is an enlarged section of the tube retainer.

To minimize the temperature differential between the glass envelope of the tubes 30 and the cold-plate 10, cooperating tube cradles 56, also generally half a circular cylinder, are secured to the vertical surfaces of cold-plate 10. Referring to FIG. 3, the tube cradle 56 is affixed to a base 58 of relatively large area, the base, in turn, being secured to the cold-plate to insure good thermal conduction between the tube cradle and the cold-plate. Tube cradle 56 has it vertical edges formed with flexible fingers 56*a* which spring outwardly slightly as the cradle is pushed into engagement with the tube clamp 52 and then spring inwardly to create a circumferential pressure on the tube clamp and the electron tube contained therein. To improve the heat conductivity from the tube envelope to the split retainer, the inner surface of at least the tube clamp, and preferably the tube cradle also, is coated with a resilient, thermally conductive material, such as thermally conductive rubber. As shown in the cross-sectional view of FIG. 4, the inner surface of tube clamp 52 is covered with a layer or coating 58 of thermally conductive material. As circumferential pressure is applied to the outer surface of tube clamp 52 by tube cradle 56 the resilient material flows into the irregularities on the glass surface of the envelope, as shown in the enlarged section of FIG. 5, making a very intimate contact between the glass and the flexible material. This good contact reduces the dead air pockets that normally exist between the glass and the tube retainer, and materially improves the heat conductivity from the tube envelope to the tube clamp and hence to the cold-plate. Thus, when the chassis is assembled, the electron tubes are surrounded by the tube retainer, in intimate contact therewith, and the tube cradle is in firm contact with the tube clamp and the cold-plate, with the result that there is efficient heat transfer from the tube envelope to the coolant flowing through the cold-plate.

The chassis package is completed by cover 60 which surrounds circuit board 36 and circuit plate 38 and makes contact around its lower edges with flexible fingers 26. The cover is secured to the central plate 20, as by screws 62, and in addition to providing an electrostatic shield for the chassis directs the flow of air within the assembly to achieve the benefits of direct and indirect cooling.

Figure 2:
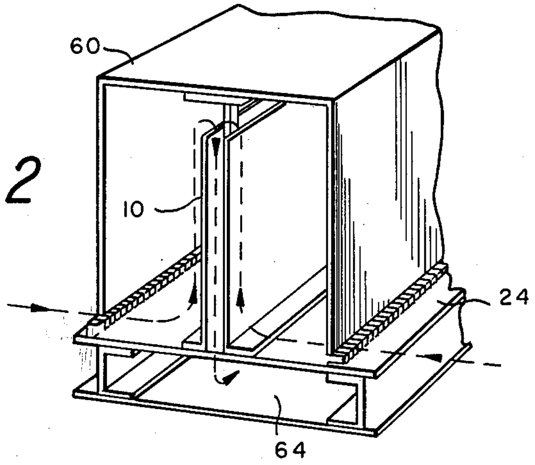
FIG. 2 is a fragmentary diagrammatic isometric view of the chassis depicting the air flow in the chassis of FIG. 1.

Referring to FIG. 1, and the air flow diagram of FIG. 2, air from a conditioned cabin space, or other suitable source, enters all around the lower peripheral edge of the package through the openings between the flexible fingers 26 on the plate 24. It then passes upward over the low heat dissipating components of the circuit, picking up any heat they may be dissipating, and then past the leads 30*a* of the electron tubes and over a large fraction of the outside surface of the tube clamp and cradle. The heat transferred from the tube to the coolant by this direct contact relieves some of the cooling requirement of the cold-plate. After passing over the tubes, the air enters the openings 12 along the upper edge of the cold-plate where its direction is changed to pass down through the ducts inside the cold-plate for discharge. In the event the cooling air is supplied from a conditioned space, in order that the discharged coolant does not heat the ambient, it is discharged into a suitable duct or plenum chamber 64 (FIG. 2) for discharge outside the conditioned space. As was mentioned earlier, heat from the tubes is thermally conducted through the resilient thermal conductive material to the tube clamp and cradle and thence to the cold-plate for exchange with the fluid coolant passing therethrough.

From the foregoing description it is seen that applicant has provided an electronic package of high component packing density, and a method of cooling the same which utilizes both direct and indirect cooling techniques. The circuit components which must be kept at a relatively low temperature for reliable operation are cooled first, and components capable of operating at high temperatures, for example, the tubes are cooled to some extent by the direct method before the coolant has been appreciably heated. Thereafter, further cooling of the tubes is afforded by the cold-plate, indirect method, the improved tube retainers insuring a minimum temperature differential between the envelope of the tube and the cold-plate. It is to be noted also that more effective use is made of the cold-plate than in the conventional use of this technique in that its effectiveness is essentially doubled; the cool incoming air passes over the outside of the cold-plate to cool it, and then passes down through the inside to cool it further. Thus, in effect, there is a double passage of air over the surfaces of the cold-plate. This improvement in cooling efficiency, moreover, is not at the expense of difficulty of fabrication and maintenance of the electronic circuitry. All of the circuit components, including the tubes, are on a single circuit board which is readily removable for servicing.

Although a two-chamber chassis has been described by way of example, it will be appreciated that the benefits of the invention can be achieved by a single chamber, one wall of which consists of the cold-plate. It will be appreciated, too, that printed circuit boards can be used on both sides of the chassis should circuit considerations require, and the elements making up the chassis need not take the exact form illustrated. Thus, while the principles of the invention have been described in connection with specific apparatus, it is to be understood that this description is made only by way of example and not as a limitation to the scope of the invention as set forth in the objects thereof and in the appended claims.

What is claimed is:

1. An electronic equipment package comprising, in combination, a generally rectangular enclosure having top and bottom walls and including as a first side wall thereof a relatively thick, substantially flat plate having length and width dimensions and having fluid passages therein extending in the direction of the width dimension, said passages communicating at one end thereof with the interior of the enclosure near the top thereof and at the other end with a plenum chamber, a circuit board supporting electronic components arranged opposite said plate and constituting a second side wall of said enclosure, said enclosure having openings therein along at least a portion of the junction of said second side wall with said bottom wall through which cooling fluid is introduced, whereby said cooling fluid first passes directly over said electronic components and then enters said one end of said passages and is discharged into said plenum chamber.

2. An electronic equipment package comprising, in combination, a generally rectangular enclosure including as one side wall thereof a relatively thick, substantially flat plate having fluid passages therein, a circuit board supporting electronic components spaced from said plate and parallel thereto constituting the other side wall of said enclosure, said enclosure also having top and bottom walls separably joined to said side walls, said passages communicating at one end with the interior of said enclosure near said top wall and terminating at the other end exteriorly of said bottom wall, said enclosure having openings along the junction of said circuit board and said bottom wall through which cooling fluid is introduced, whereby said cooling fluid first passes directly over said electronic components and then through said passages to provide further transfer of heat from said electronic components to said fluid.

3. An electronic equipment package comprising, in combination, a generally rectangular enclosure including as one side wall thereof a relatively thick, substantially flat plate having fluid passages therein, a circuit board supporting electronic components, including at least one electronic tube, and interwiring therefor, said board being spaced from and parallel to said plate and constituting the other side wall of said enclosure, at least one semi-circular cylinder of thermally conductive material secured to said circuit board and partially surrounding said electron tube, a corresponding semi-circular cylinder of thermally conductive material secured to said plate and separably surrounding the cylinder secured to said circuit board, said enclosure also having top and bottom walls separably joined to said side walls, said passages communicating at one end with the interior of said enclosure near said top wall and terminating at the other end exteriorly of said enclosure, said enclosure having openings distributed along the junction of said circuit board and said bottom wall through which cooling fluid is introduced, whereby said cooling fluid first passes directly over said electronic components and then through said passages to provide further transfer of heat from said electronic tube to said fluid.

4. Apparatus in accordance with claim 3 further including a plenum chamber secured to said bottom wall exteriorly of said enclosure in alignment with said plate, said passages terminating at said other end in said plenum chamber.

5. An electronic equipment package comprising, in combination, a generally rectangular enclosure including as opposite side walls a pair of circuit boards disposed parallel to each other and supporting electronic components on the inner surfaces thereof, a relatively thick, substantially flat plate having fluid passages therein disposed parallel to and intermediate said side walls and dividing said enclosure into two compartments, said enclosure further including top and bottom walls separably joined to said side walls and engaging the upper and lower edges of said plate, a plenum chamber secured to said bottom wall exteriorly of said enclosure in alignment with said plate, said passages communicating at one end with the interior of both said compartments near said top wall and at the other end with said plenum chamber, said enclosure having openings distributed along at least a portion of the junction of said circuit board with said bottom wall through which cooling fluid is introduced, whereby said cooling fluid first passes directly over said electronic components and the lateral surfaces of said plate and then through said passages for discharge into said plenum chamber.

6. Apparatus in accordance with claim 5 wherein said electronic components include at least one electron tube mounted on and wired to other components on a corresponding one of said circuit boards, a semi-circular cylindrical tube cradle formed of thermally conductive material secured to said circuit board and partially surrounding said electron tube, and a semi-circular cylindrical tube clamp formed of thermally conductive material secured to said plate and partially surrounding said tube cradle.

7. An electronic equipment package comprising, in combination, a generally rectangular enclosure including as one side wall thereof a relatively thick, substantially flat plate having fluid passages therein, a circuit board supporting electronic components, including at least one electronic tube, and interwiring therefor, said board being spaced from and parallel to said plate and constituting the other side wall of said enclosure, at least one semi-circular cylinder of thermally conductive material secured to said circuit board and partially surrounding said electron tube, said cylinder being lined with resilient thermally conductive material, a corresponding semi-circular cylinder of thermally conductive material secured to said plate and separably surrounding the cylinder secured to said circuit board, said enclosure also having top and bottom wall separably joined to said side walls, said passages communicating at one end with the interior of said enclosure near said top wall and terminating at the other end exteriorly of said enclosure, said enclosure having openings distributed along the junction of said circuit board and said bottom wall through which cooling fluid is introduced, whereby said cooling fluid first passes directly over said electronic components and then through said passages to provide further transfer of heat from said electronic tube to said fluid.

8. An electronic equipment package comprising, in combination, a generally rectangular enclosure including as opposite side walls a pair of circuit boards disposed parallel to each other and supporting electronic components on the inner surface thereof, said components including at least one electron tube mounted on and wired to other components on a corresponding one of said circuit boards, a semi-circular cylindrical tube cradle formed of thermally conductive material secured to said circuit board and partially surrounding said electron tube, a semi-circular cylindrical tube clamp formed of thermally conductive material secured to said plate and partially surrounding said tube cradle, and resilient thermally conductive material lining said cradle and said clamp; a plate having fluid passages therein disposed parallel to and intermediate said side walls and dividing said enclosure into two compartments, said enclosure further including top and bottom walls separably joined to said side walls and engaging the upper and lower edges of said plate, a plenum chamber secured to said bottom wall exteriorly of said enclosure in alignment with said plate, said passages communicating at one end with the interior of both said compartments near said top wall and at the other end with said plenum chamber, said enclosure having openings distributed along at least a portion of the junction of said circuit boards with said bottom wall through which cooling fluid is introduced, whereby said cooling fluid first passes directly over said electronic components and the lateral surfaces of said plate and then through said passages for discharge into said plenum chamber.

References Cited in the file of this patent

UNITED STATES PATENTS

| | | |
|---|---|---|
| 2,668,933 | Shapiro | Feb. 9, 1954 |
| 2,791,621 | Hewitt et al. | May 7, 1957 |
| 2,876,277 | Badger | Mar. 3, 1959 |
| 2,912,624 | Wagner | Nov. 10, 1959 |
| 2,948,518 | Kraus | Aug. 9, 1960 |
| 2,974,263 | Akins | Mar. 7, 1961 |
| 3,011,105 | Le Blanc | Nov. 28, 1961 |
| 3,013,186 | Jones | Dec. 12, 1961 |
| 3,020,451 | McAdams | Feb. 6, 1962 |